(12) United States Patent
Wang et al.

(10) Patent No.: US 8,634,280 B1
(45) Date of Patent: Jan. 21, 2014

(54) METHOD AND SYSTEM FOR PROVIDING AN ENERGY ASSISTED MAGNETIC RECORDING WRITER HAVING A RING SHAPED NFT

(75) Inventors: Zhongyan Wang, San Ramon, CA (US); Hongxing Yuan, San Ramon, CA (US); Zhong Shi, Dublin, CA (US); Yufeng Hu, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 206 days.

(21) Appl. No.: 13/165,017

(22) Filed: Jun. 21, 2011

(51) Int. Cl.
*G11B 11/00* (2006.01)
(52) U.S. Cl.
USPC .............. 369/13.33; 369/13.13; 360/125.31
(58) Field of Classification Search
USPC .......... 369/13.33, 13.32, 13.24, 13.14, 13.03, 369/13.12, 13.13, 13.01, 13.35, 13.17, 369/112.27, 112.09; 360/59, 125.31, 360/125.74, 125.75
See application file for complete search history.

(56) References Cited

U.S. PATENT DOCUMENTS

| | | | |
|---|---|---|---|
| 4,106,975 A | 8/1978 | Berkenblit et al. | |
| 4,667,395 A | 5/1987 | Ahlgren et al. | |
| 5,940,697 A | 8/1999 | Yoo et al. | |
| 5,994,747 A | 11/1999 | Wu | |
| 6,746,877 B1 | 6/2004 | Hornik et al. | |
| 6,795,630 B2 | 9/2004 | Challener et al. | |
| 7,272,079 B2 | 9/2007 | Challener | |
| 7,500,255 B2 | 3/2009 | Seigler et al. | |
| 7,791,839 B2* | 9/2010 | Olson et al. | 360/125.31 |
| 7,965,464 B2* | 6/2011 | Batra et al. | 360/59 |
| 8,024,748 B1 | 9/2011 | Moravec et al. | |
| 8,134,794 B1 | 3/2012 | Wang | |
| 8,164,855 B1 | 4/2012 | Gibbons et al. | |
| 8,248,891 B2* | 8/2012 | Lee et al. | 369/13.17 |
| 8,286,329 B1* | 10/2012 | Zhao et al. | 29/592.1 |
| 8,307,540 B1* | 11/2012 | Tran et al. | 29/603.16 |
| 8,310,901 B1 | 11/2012 | Batra et al. | |
| 8,375,565 B2* | 2/2013 | Hu et al. | 29/603.16 |
| 8,391,108 B2* | 3/2013 | Peng et al. | 369/13.33 |
| 8,416,530 B2* | 4/2013 | Gao et al. | 360/125.31 |
| 8,456,969 B1* | 6/2013 | Mooney et al. | 369/13.33 |
| 8,486,286 B1 | 7/2013 | Gao et al. | |
| 2003/0137772 A1 | 7/2003 | Challener | |
| 2008/0068748 A1 | 3/2008 | Olson et al. | |
| 2010/0104768 A1 | 4/2010 | Xiao et al. | |
| 2010/0123965 A1 | 5/2010 | Lee et al. | |
| 2010/0123967 A1 | 5/2010 | Batra et al. | |
| 2010/0214685 A1 | 8/2010 | Seigler et al. | |
| 2011/0090588 A1* | 4/2011 | Gao et al. | 360/59 |

OTHER PUBLICATIONS

Zhongyan Wang, et al., "An approach for nanometer trench and hole formation," Optical Microlithography XXI, Proceedings of the SPIE, vol. 6924, pp. 692447-692447-8 (2008).

* cited by examiner

*Primary Examiner* — Ali Neyzari

(57) ABSTRACT

A method and system provides an EAMR transducer. The transducer is coupled with a laser for providing energy and has an air-bearing surface (ABS) configured to reside in proximity to a media during use. The EAMR transducer includes a near field transducer (NFT) for focusing the energy onto the region of the media, a write pole, and at least one coil for energizing the write pole. The NFT includes a ring portion having an aperture therein and a pin portion proximate to the ABS. The write pole is configured to write to a region of the media.

19 Claims, 15 Drawing Sheets

METHOD AND SYSTEM FOR PROVIDING AN ENERGY ASSISTED MAGNETIC RECORDING WRITER HAVING A RING SHAPED NFT

BACKGROUND

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, and a conventional pole 30.

In operation, light from a laser (not shown) is incident on the grating 20, which coupled light to the waveguide 12. Light is guided by the conventional waveguide 12 to the NFT 22 near the air-bearing surface (ABS). The NFT 22 utilizes local resonances in surface plasmons to focus the light to magnetic recording media (not shown), such as a disk. The surface plasmons used by the NFT 22 are electromagnetic waves that propagate along metal/dielectric interfaces. At resonance, the NFT 22 couples the optical energy of the surface plasmons efficiently into the recording medium layer with a confined optical spot which is much smaller than the optical diffraction limit. This optical spot can typically heat the recording medium layer above the Curie point in nano-seconds. High density bits can be written on a high coercivity medium with a pole 30 having modest magnetic field.

Although the conventional EAMR transducer 10 may function, there are drawbacks. The surface plamsons used in recording are sensitive to the boundary conditions. For example, changes in the geometry or properties of the surface affect the generation and propagation of surface plasmons. Thus, the geometry of the conventional NFT 22 is typically optimized for higher coupling efficiency. However, under such conditions, the conventional NFT 22 is heated. The working temperature of the conventional NFT 22 may be sufficiently high that the NFT 22 at least partially melts during use. Even when thermally coupled with the pole 30, the NFT 22 may be damaged during use. Thus, performance and reliability of the conventional EAMR head 10 may be adversely affected.

Accordingly, what is needed is a system and method for improving performance and reliability of an EAMR transducer.

BRIEF SUMMARY OF THE INVENTION

A method and system provides an EAMR transducer. The transducer is coupled with a laser for providing energy and has an air-bearing surface (ABS) configured to reside in proximity to a media during use. The EAMR transducer includes a near field transducer (NFT) for focusing the energy onto the region of the media, a write pole, and at least one coil for energizing the write pole. The NFT includes a ring portion having an aperture therein and a pin portion proximate to the ABS. The write pole is configured to write to a region of the media.

DETAILED DESCRIPTION OF THE EMBODIMENTS OF THE INVENTION

Figure 1:
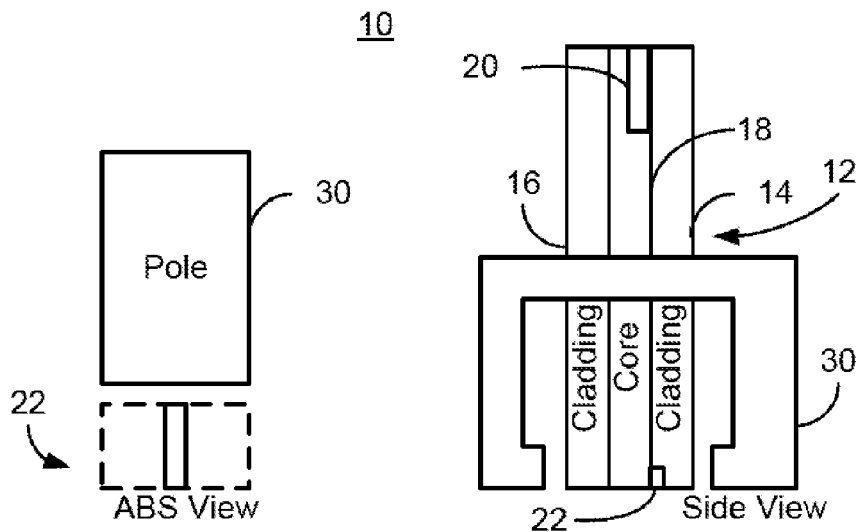
FIG. 1 is a diagram depicting a conventional EAMR transducer.
Figure 2:
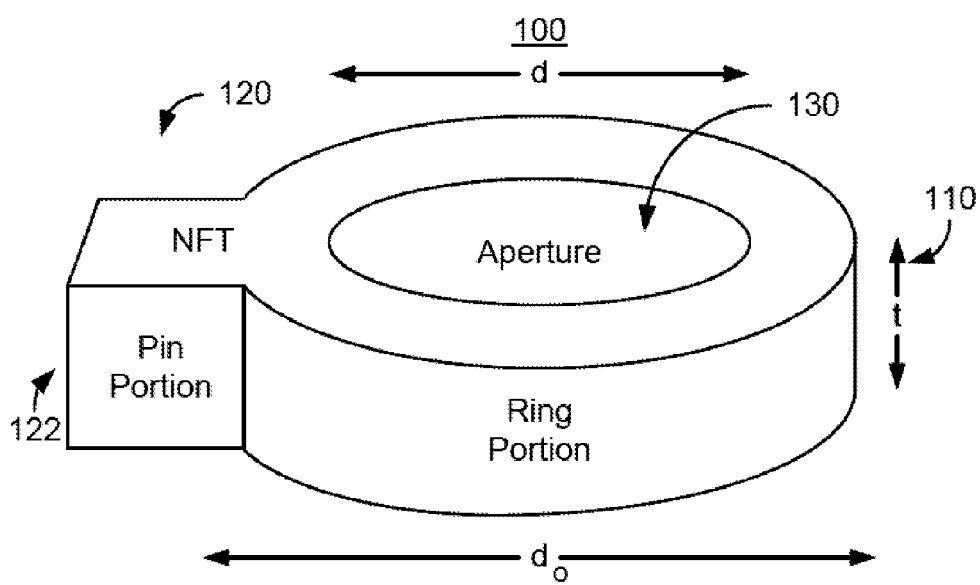
FIG. 2 is a diagram depicting a perspective view of an exemplary embodiment of an NFT.

FIG. 2 is a diagram depicting a perspective view of an exemplary embodiment of a near field transducer (NFT) 100. For clarity, FIG. 2 is not to scale. The NFT 100 includes a ring portion 110 and a pin portion 120. The pin portion 120 is typically closer to the ABS of the transducer in which the NFT 100 is used than the ring portion 110. In particular, a surface 122 of the pin portion 120 is at the ABS. The ring portion 110 is depicted as having a circular footprint. However, in other embodiments, the ring portion 110 may have another footprint including, but not limited to an oval, a square, or another shape. However, it is currently desired to have the ring portion 110 be circular. The ring portion 110 also has an aperture 130 therein. In the embodiment shown, the aperture 130 is circular in shape and centered at the center of the ring portion 110. However, in other embodiments, the aperture 130 may not be centered. In such embodiments, portions of the ring 110 may be wider than others. Similarly, in some embodiments, the aperture 130 may have another footprint including but not limited to an oval, a square, or another shape. The aperture 130 is shown as having the same shaped footprint as the ring portion 110. However, in alternate embodiments, the aperture 130 might be shaped differently from the ring portion 110.

The aperture 130 may include materials other than used for the ring portion 110. For example, in some embodiments, the NFT 100 includes at least one of Au and Ag. In some such embodiments the NFT 100 consists of Au. The aperture 130 may have materials other than Au therein. In some embodiments the material in the aperture 130 is an insulator. In other embodiments a metal may be used. For example, an optical dielectric such as aluminum oxide might be used in the aperture 130. In other embodiments, a heat sink material such as at least one of Cu (e.g. Cu or a Cu alloy), aluminum nitride, and beryllium oxide may be used in the aperture 130. The material in the aperture 130 is generally desired to be different from the material used in at least the ring portion 110 of the NFT 100 so that surface plasmons tend to be confined to the ring portion 110. More specifically, suppose the NFT 100 (i.e. the pin portion 120 and the ring portion 110) is formed from a first material having a first real index of refraction (n1) and a first imaginary index of refraction (k1). In the aperture 130 is a second material having a second real index of refraction (n2) and a second imaginary index of refraction (k2). In such an embodiment, a first product of n1 and k1 (n1*k1) is not more than one tenth of a second product of n2 and k2 (n2*k2). Thus, 10*n1*k1 is less than or equal to n2*k2. In such an embodiment, the surface plasmons may be generated on and confined to the ring portion 110 and pin portion 120 of the NFT 100.

The configuration of the aperture 130 and ring portion 110 may vary based on the working parameters for the device in which the NFT 100 is used. In some embodiments, the aperture 130 has a diameter, d, of at least one hundred nanometers and not more than two hundred nanometers. In some such embodiments, the aperture has a diameter of at least one hundred forty nanometers and not more than one hundred eighty nanometers. Similarly the outside diameter, $d_o$, may not be more than three hundred nanometers for working wavelengths of light in the range of 700-800 nm and Au being used for the NFT 100. However, the diameters of the aperture 130 and the ring portion 110 may vary based upon parameters such as the wavelength of the light used. For example, in some embodiments, the outside diameter of the ring portion 110 is proportional to the wavelength of light used. Further in some embodiments, the width of the ring (the difference between the outside diameter, $d_o$, and the aperture diameter, d, to be at least twenty five nanometers. In some embodiments, the thickness, t, of the NFT 100' is desired to be at least forty-five and not more than fifty-five nanometers. However, in other embodiments the thickness of the NFT 100' may be different.

The performance of an EAMR transducer or other device using the NFT 100 may be improved. Use of a ring structure 110 in the NFT 100 improves confinement of surface plamsons to the perimeter of the NFT 100. Thus, the local resonance of the plasmons may be improved. As a result, the efficiency of the NFT 100 may be enhanced. In addition, the aperture 130 may be filled with a heat sink material. Use of the heat sink within the ring portion 110 of the NFT may improve the heat transfer from the NFT 100 to a heat sink such as a pole (not shown). As a result, thermal management for the NFT 100 may be improved. The NFT 100 may be less likely to be melted or otherwise damaged due to heat generated at or near the NFT 100. Thus, performance and reliability of the NFT 100 and a device using the NFT 100 may be improved.

Figure 3:
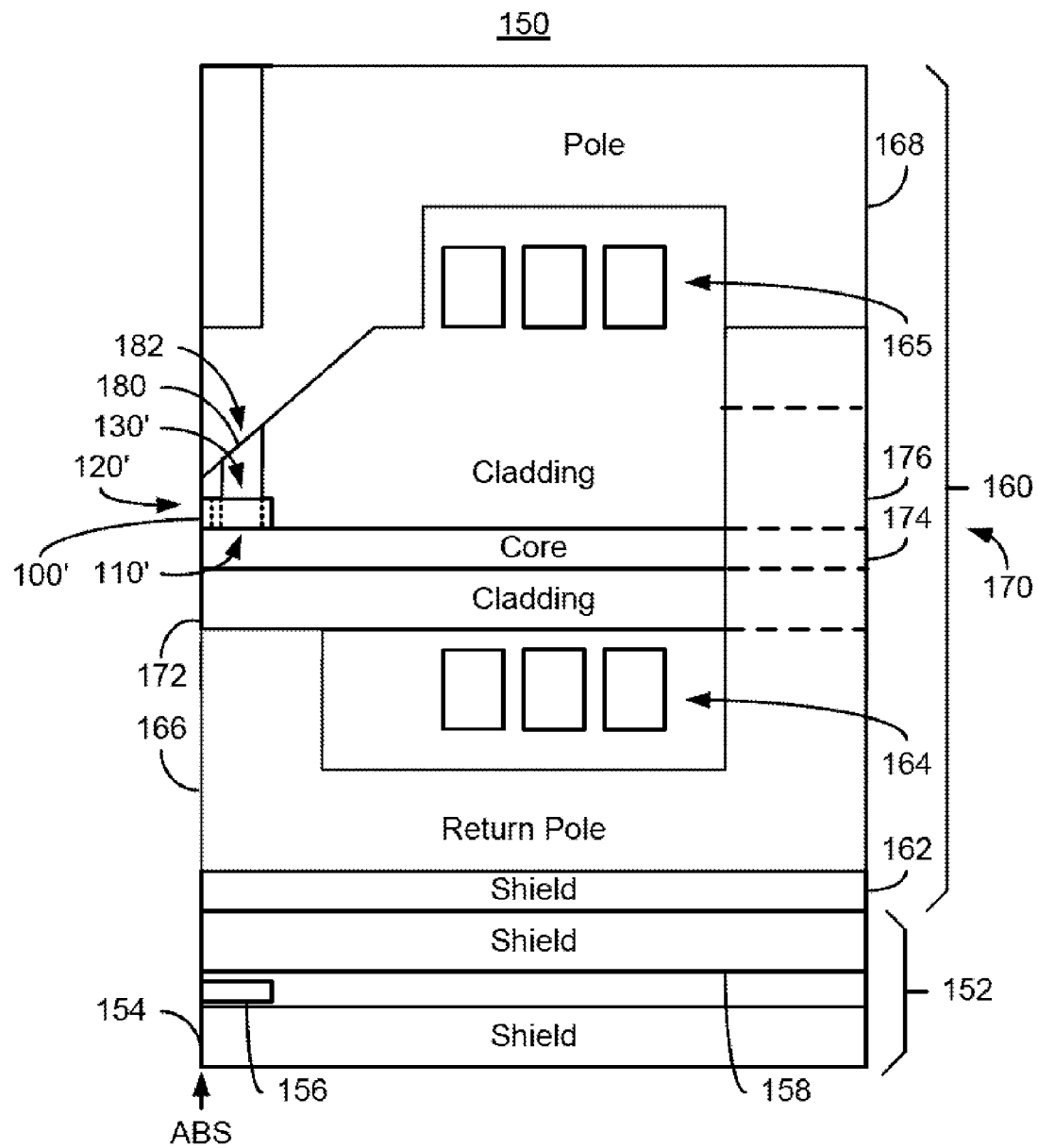
FIG. 3 is a diagram depicting an exemplary embodiment of an EAMR head.

FIG. 3 depicts one embodiment of an EAMR head 150 using an NFT 100'. For clarity, FIG. 3 is not to scale. For simplicity not all portions of the EAMR head 150 are shown. In addition, although the EAMR head 150 is depicted in the context of particular components other and/or different components may be used. Further, the arrangement of components may vary in different embodiments. The EAMR head 150 may be used in an EAMR disk drive. The EAMR head 150 includes a read transducer 152 and a write transducer 160. The read transducer 152 includes shields 154 and 158 and reader sensor 156. In some embodiment, the read sensor 156 may be a giant magnetoresistance sensor, such as a spin tunneling junction. However, in other embodiments, another sensor may be used.

The EAMR transducer 150 includes waveguide 170, write pole 168, return pole 166, coil(s) 164 and 165, and shield 162. The EAMR transducer 160 may also include a grating (not shown) that is used to couple light from the laser (not shown) to the waveguide 170. The coil(s) 164 may be used to energize the write pole 140 during writing. In the embodiment shown, the shield 162 is depicted as separate from the return pole 166. However, in another embodiment, these components may be combined. The waveguide 170 includes cladding 172 and 176 as well as core 174. Further, the waveguide 170 is shown as residing between the pole 168 and return pole 166. In another embodiment, the pole 168 may be between the waveguide and the return pole 166. The coils 164 and 165 may form a single, helical coil or may be separate pancake coils.

The EAMR transducer 150 also includes an NFT 100' and heat sink 180. The NFT 100' is analogous to the NFT 100. The NFT 100' thus includes a ring portion 110' having aperture 130' therein and pin portion 120' analogous to the ring portion 110, aperture 130, and pin portion 120, respectively. The pin portion 120' is between the ring portion 110' and the ABS. Thus, the ring portion 110' is recessed from the ABS and thus is shown by a dashed line in the ABS view of FIG. 3. The ring portion 110' extends further in the track width direction (perpendicular to the plane of the page in FIG. 3) than the pin portion 120'. Although termed a ring, the ring portion 110' of the NFT 100' need not be ring-shaped. For example, instead of having a circular cross-sectional shape, the ring portion 110' may be square, rectangular, or have another shape. Similarly, the aperture 130' is shown by a dashed line in FIG. 3. The aperture 130' may have the same cross-sectional shape (or foot print) as the ring portion 110'. In other embodiments, the aperture 130' may have a different cross-sectional shape than the ring portion 110'.

A portion of the heat sink 180 resides within the aperture 130'. Thus, the heat sink 180 is in thermal contact with the inside surface of the ring portion 110' of the NFT 100'. The heat sink 180 also has a top surface 182 in thermal contact with the pole 168. In the embodiment shown, the heat sink 180 is in direct physical contact with the NFT 100' and the pole 168. The top surface 182 of the heat sink 180 is sloped because the bottom surface of the pole 168 is sloped. In the embodiment shown, a portion of the bottom surface of the pole 168 proximate to the ABS is not parallel to the top surface of the NFT 100'. In some embodiments, this portion of the bottom surface of the pole 168 may be configured to be parallel to the top surface of the NFT 100'.

In operation the waveguide 170 directs energy from the laser to the ABS and more specifically to the NFT 100'. The NFT 100' is optically coupled with the waveguide 170, receiving energy from the core 174. The NFT 100' is also proximate to the ABS. For example, the NFT 100' is shown as having a surface of the pin portion 120' occupying part of the ABS. The NFT 100' focuses energy from the waveguide 170 onto a region of the media (not shown). In particular, a surface plasmon resonance is developed across the ring portion 110' of the NFT 100'. This resonance allows the NFT 100' to deliver optical energy to the media (not shown) in a small thermal spot. The write pole 168 is configured to write to the region of the media heated by the NFT 100'. The heat sink 180 is thermally coupled near its bottom with the NFT 100' and at its top with the bottom surface of the pole 168. During operation, therefore, heat generated at the NFT 100' may be conducted by the heat sink 180 away from the NFT 100' and to the pole 168.

The EAMR transducer 160 and thus the EAMR head 150 may have improved performance and reliability. Use of the NFT 100' having a ring portion 110' may allow for improved efficiency. The ring portion 110' has aperture 130'. Charges on the ring portion 110' of the NFT 100' do not penetrate significantly into the aperture 130'/heat sink 180. A plasmon resonance developed for the material used for the NFT 100' is thus not well supported for the material used for the heat sink 180. The plasmons at the NFT 100' remain concentrated near the edges of the NFT 100'. As a result, the NFT 100' may more efficiently transfer energy from the plasmons, and thus the laser (not shown), to the media. Consequently, performance of the EAMR transducer 150 may be improved. Further, use of the heat sink 180 that penetrates into the aperture 130' allows for heat to be more efficiently carried away from the NFT 100'. Consequently, the NFT 100' may be less likely to be damaged during use. Performance and reliability of the NFT 100' and EAMR head 150 may thus be improved.

Figure 4:
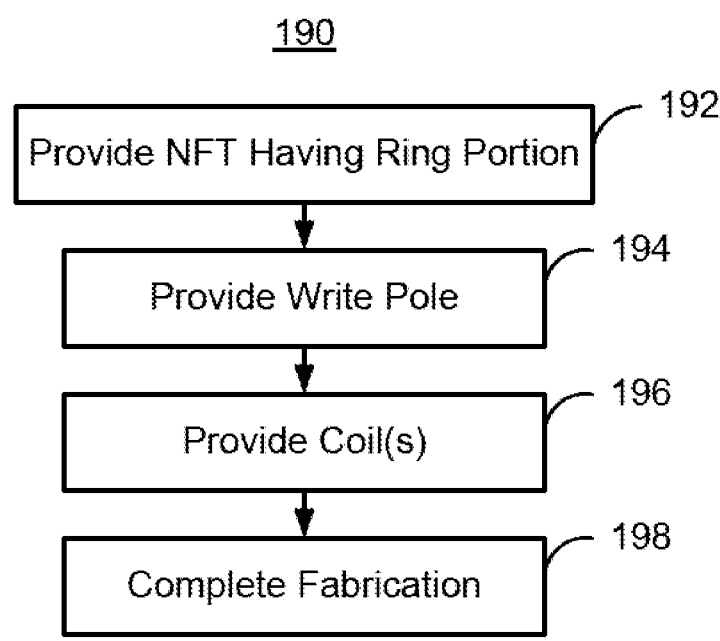
FIG. 4 is a flow chart depicting an exemplary embodiment of a method for providing an NFT having an aperture in an EAMR transducer.

FIG. 4 depicts one embodiment of a method 190 for fabricating an EAMR transducer having an NFT having a ring portion. For simplicity, some steps may be omitted, interleaved, and/or combined. The EAMR transducer being fabricated may be part of a merged head that also includes a read head (not shown) and resides on a slider (not shown) in a disk drive. The method 190 is also described in the context of providing a single EAMR transducer. However, the method 190 may be used to fabricate multiple transducers at substantially the same time. The method 190 and system are also described in the context of particular layers. However, in some embodiments, such layers may include multiple sublayers. The method 190 also may commence after formation of other portions of the EAMR transducer. In one embodiment, the method 190 commences after formation of portions of the waveguide, such as a core. Thus, a flat surface for formation of subsequent structures may have been provided. The method 190 is also described in the context of the NFT 100/100' and the EAMR head 150. However the method 190 may be used to form other NFTs and other EAMR heads/transducers.

An NFT 100/100' with a ring portion 110/110' having an aperture 130/130' therein is formed, via step 192. The NFT 100/100' provided in step 192 may also have a pin portion 120/120'. The pin portion 120/120' has a width, as viewed from the ABS, that is significantly less than the ring portion 110/110'. Step 192 includes depositing the material(s) for the NFT 100/100', providing a mask having the desired shape (e.g. disk and pin masks), and removing the exposed portion of the NFT material. The NFT 100/100' is conductive and, in some embodiments, includes Au. In other embodiments, the NFT 100/100' may include different or additional materials. Step 192 may also include refilling the regions around the NFT 100/100' with an optical dielectric or other insulator. An aperture 130/130' may then be formed in the NFT 100/100' in step 192.

A write pole 168 configured to write to a region of the media heated by the laser energy is provided, via step 194. The write pole 168 has a bottom surface, a portion of which may be thermally coupled with the top surface of a heat sink. One or more write coils 164 and 165 may also be provided for energizing the write pole 168, via step 196. Fabrication of the EAMR head 150 may then be completed, via step 198. For example, a heat sink 180 and/or other structure(s) used in the EAMR disk drive may be fabricated. A portion of the heat sink 180 resides within the aperture 130/130' of the NFT 100/100' and thermally couples the NFT 100/100' to another structure capable of dissipating heat from the NFT 100/100', such as the pole 168.

Thus, an EAMR transducer 160 including an NFT 100/100' having a ring portion 110/110' may be fabricated. The EAMR transducer 160 formed may also have a heat sink 180 residing within the aperture 130/130' of the ring portion 110/110' of the NFT 100/100' and thermally coupling the NFT 100/100' and the pole 168 may be provided. Thus, the benefits of the NFT 100/100' and EAMR head 150 may be achieved. Performance and reliability of the NFF 100/100' and EAMR head 150 may be enhanced.

Figure 5:
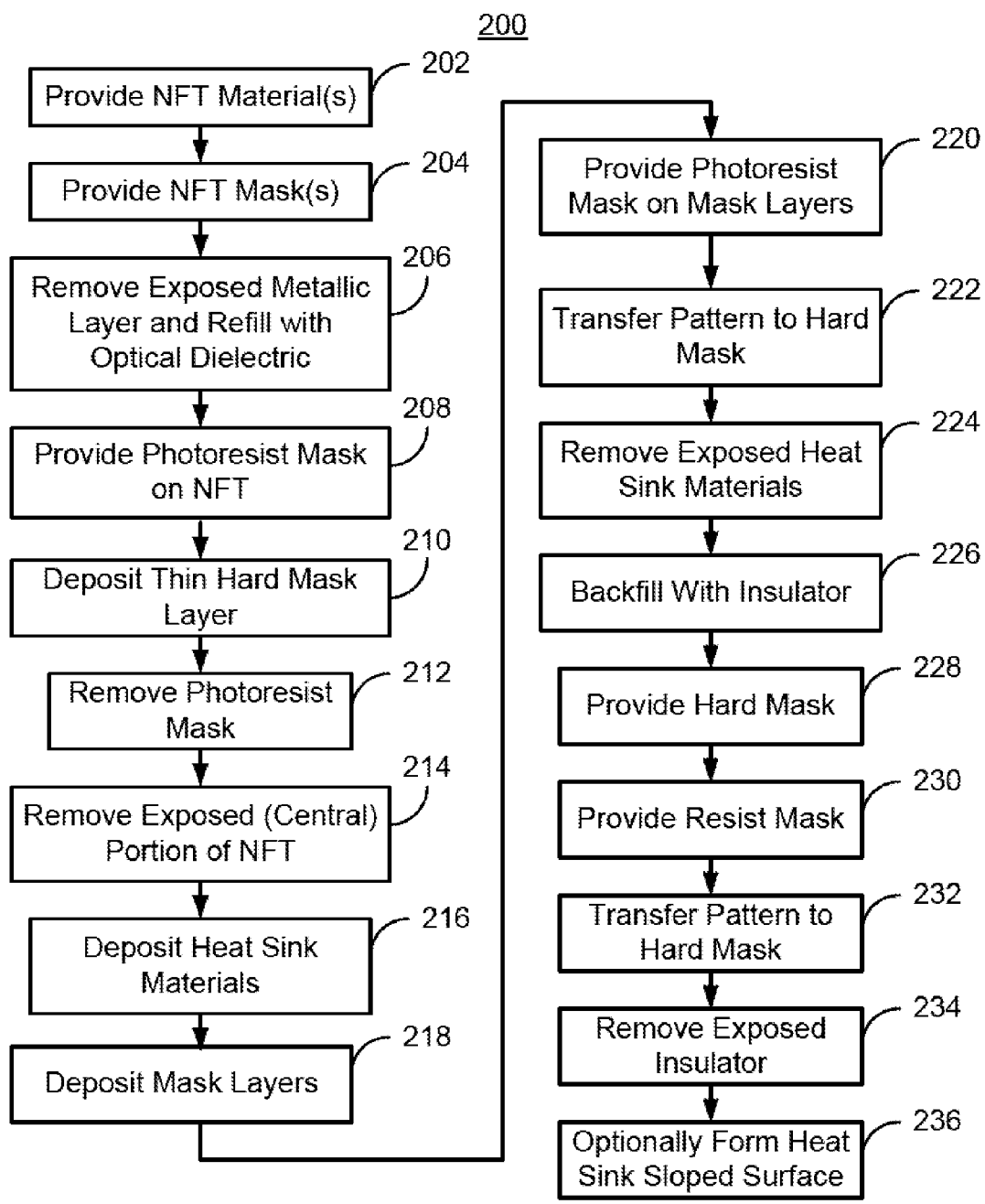
FIG. 5 is a flow chart depicting an exemplary embodiment of a method for providing an NFT having an aperture therein in an EAMR transducer.

FIG. 5 is a flow chart depicting an exemplary embodiment of a method 200 for fabricating an EAMR transducer having a self-aligned heat sink. For simplicity, some steps may be omitted, interleaved and/or combined. FIGS. 6-16 are diagrams depicting side and top views of an exemplary embodiment of a portion of an EAMR transducer during 250 fabrication. For clarity, FIGS. 6-16 are not to scale. Further, although FIGS. 6-16 depict the ABS location (location at which the ABS is to be formed) and ABS at a particular point in the pole, other embodiments may have other locations for the ABS. Referring to FIGS. 5-16, the method 200 is described in the context of the EAMR transducer 250. However, the method 200 may be used to form another device (not shown). The EAMR transducer 250 being fabricated may be part of a merged head that also includes a read head (not shown in FIGS. 6-16), a laser (not shown in FIGS. 6-16) and resides on a slider (not shown) in a disk drive. In addition, other portions of the EAMR transducer 250, such as the pole(s), shield(s), coil(s), and remaining optics are not shown. The method 200 also may commence after formation of other portions of the EAMR transducer 250. The method 200 is also described in the context of providing a single EAMR transducer 250, a single NFT in the EAMR transducer 250, and a single heat sink in the EAMR transducer 250. However, the method 200 may be used to fabricate multiple transducers and/or multiple heat sinks per transducer at substantially the same time. The method 200 and device 250 are also described in the context of particular layers. However, in some embodiments, such layers may include multiple sublayers.

The material(s) for the NFT are provided, via step 202. Step 202 may include depositing a layer of conductive material(s) such as Au. An NFT mask used in defining the NFT is provided, via step 204. Step 204 may include depositing and patterning a hard mask material that can be removed from the NFT without undue damage to the NFT. In some embodiments, SiC and/or amorphous carbon (a-C) are provided in step 204. Photolithography may then be used in patterning the SiC or a-C.

The exposed portion of the metallic layer is removed to form the NFT, via step 206. Step 206 may include ion milling the exposed metallic material(s). Thus, the pattern of the NFT mask is transferred to the NFT materials. Optical material(s) may also be provided in step 206. In some embodiments, step 206 includes depositing a layer of aluminum oxide.

Figure 6:
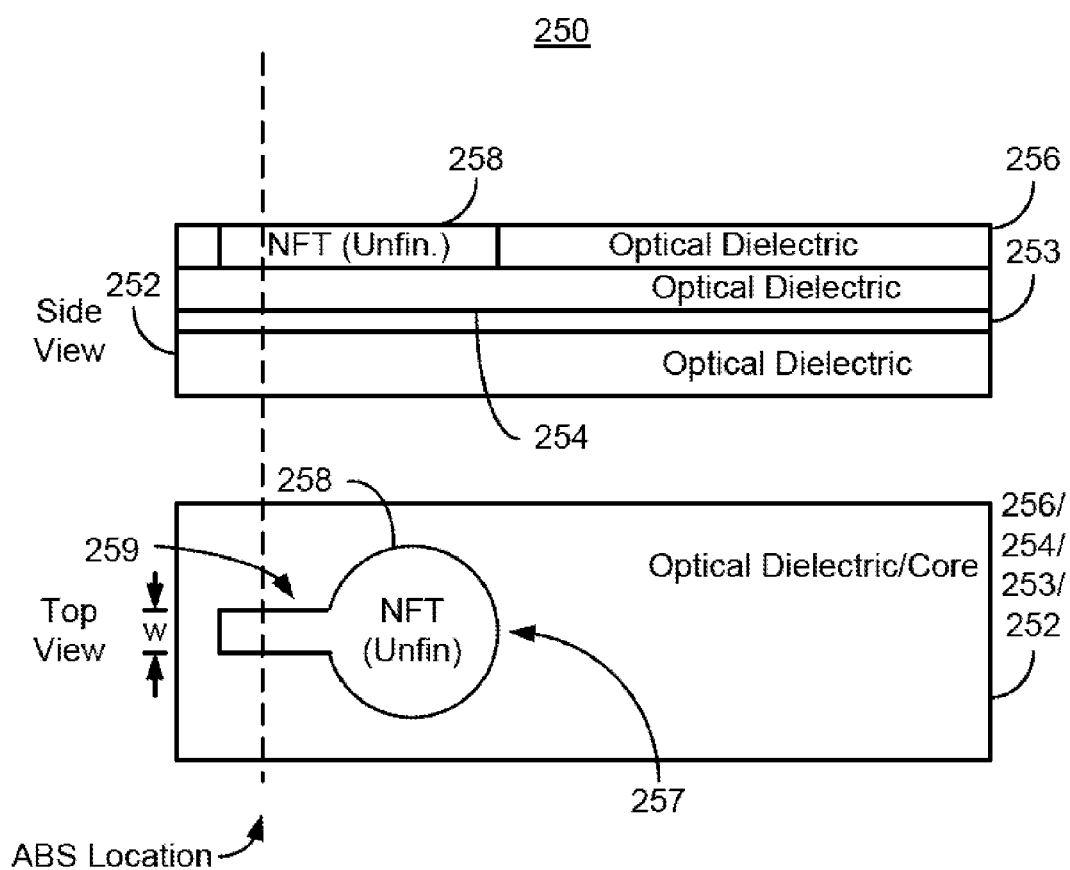
FIGS. 6-16 are diagrams depicting an exemplary embodiment of a magnetic recording transducer during fabrication.

FIG. 6 depicts the transducer 250 after step 206 is performed. Thus, waveguide including optical dielectric materials 252 and 254 for the cladding and core 253 are shown. Also shown is the NFT 258 and optical dielectric 256 deposited in step 206. The NFT 258 includes a disk portion 257 and a pin portion 259. Steps 202-206 may thus be considered to form an NFT disk. As there is no aperture in the NFT 258, the NFT 258 is unfinished.

Figure 7:
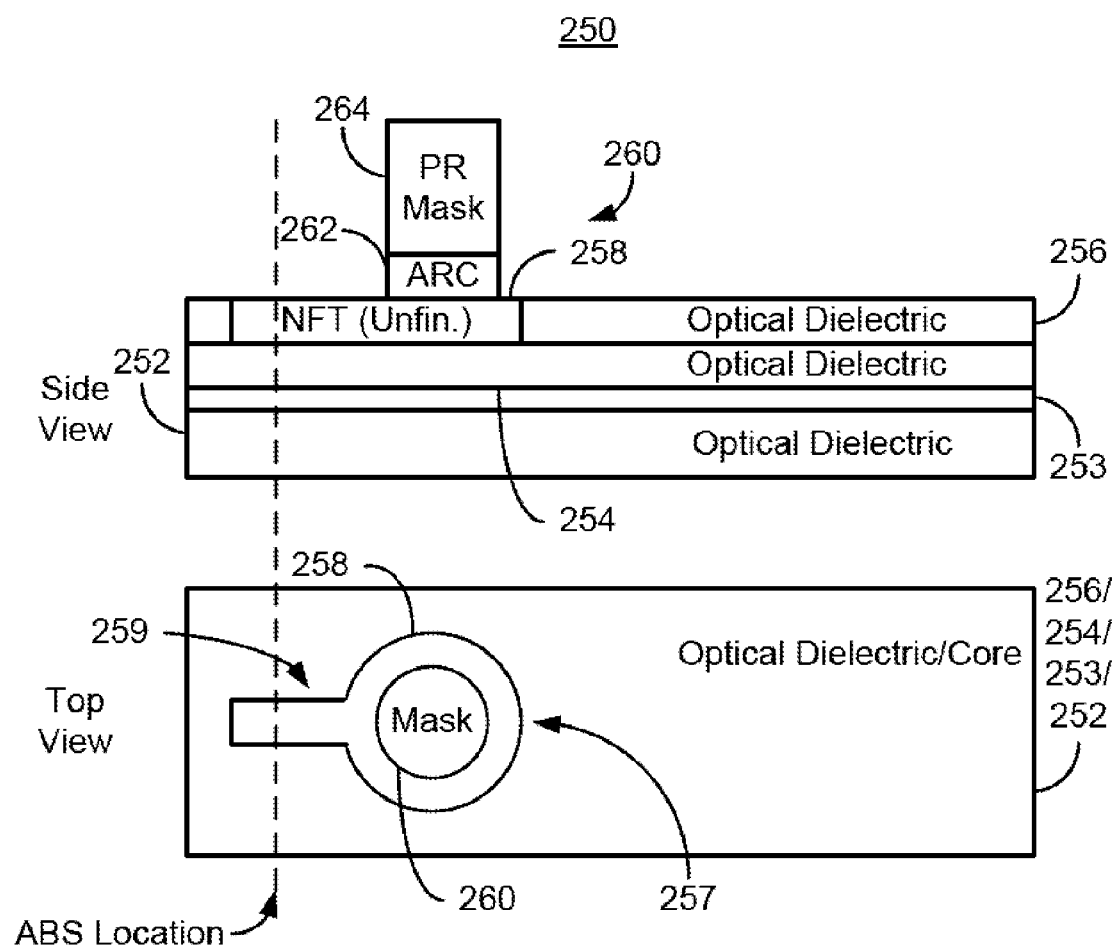

A photoresist or analogous mask for the aperture is provided on the NFT 258, via step 208. The photoresist mask may be a post residing on an antireflective coating (ARC) layer. FIG. 7 depicts the transducer 250 after step 208 is performed. Thus, mask 260 having ARC layer 262 and photoresist post 264 have been formed on the NFT 258.

Figure 8:
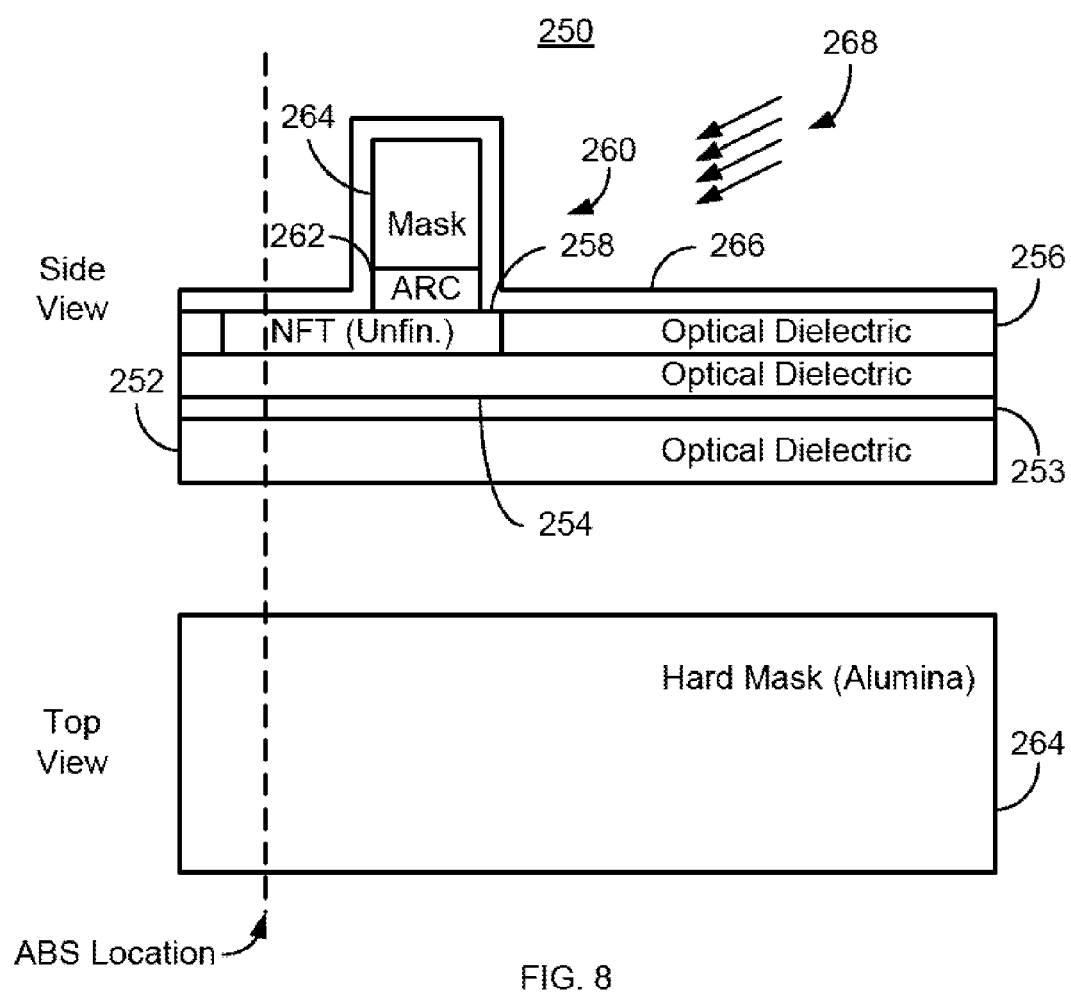

A thin hard mask layer is provided, via step 210. In some embodiments, step 210 includes depositing a thin layer of aluminum oxide. In some embodiments, the hard mask layer is at least fifteen and not more than twenty-five nanometers in thickness. In some such embodiments, the hard mask layer deposited is nominally twenty nanometers thick. However, this thickness may be adjusted. FIG. 8 depicts the transducer 250 after step 210 is performed. Thus, hard mask layer 266 is shown.

The mask 260 is removed, via step 212. Step 212 may include performing an ion mill at a nonzero angle from normal to the surface to open an aperture in the hard mask 266 on the sides of the photoresist post 264. An etch appropriate to the mask 260 may then be used in step 212. For example, an oxygen plasma reactive ion etch (RIE) may be used to remove the photoresist post 264 and the ARC layer 262. FIG. 8 also depicts the side angle ion mill of step 212 used to open the hard mask 266 on the sidewalls of the mask 260.

Figure 9:
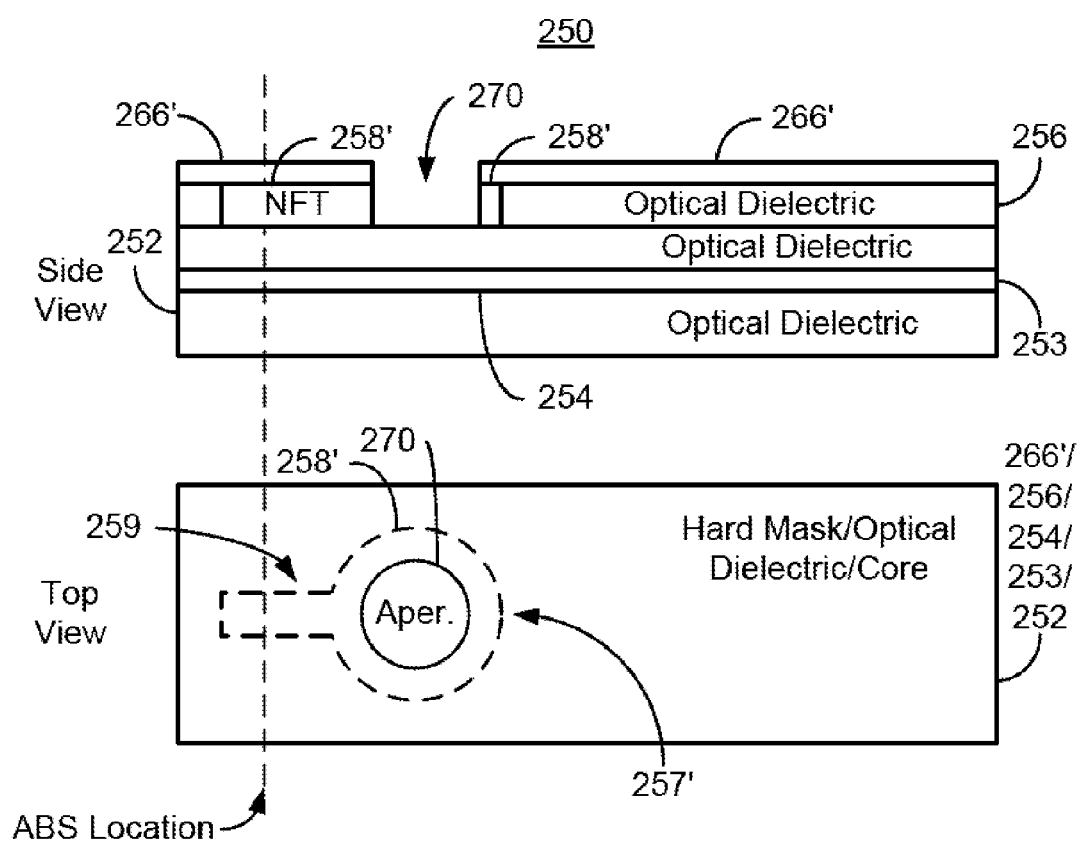

The exposed portion of the NFT 258 is removed, via step 214. For example, an Ar ion mill may be used to remove an exposed portion of a gold NFT 258. FIG. 9 depicts the EAMR transducer 250 after step 214 is completed. An aperture 270 has been formed in the hard mask 266'. A portion of the NFT 258' has also been removed. Thus, the aperture 270 extends through the NFT 258'.

Figure 10:
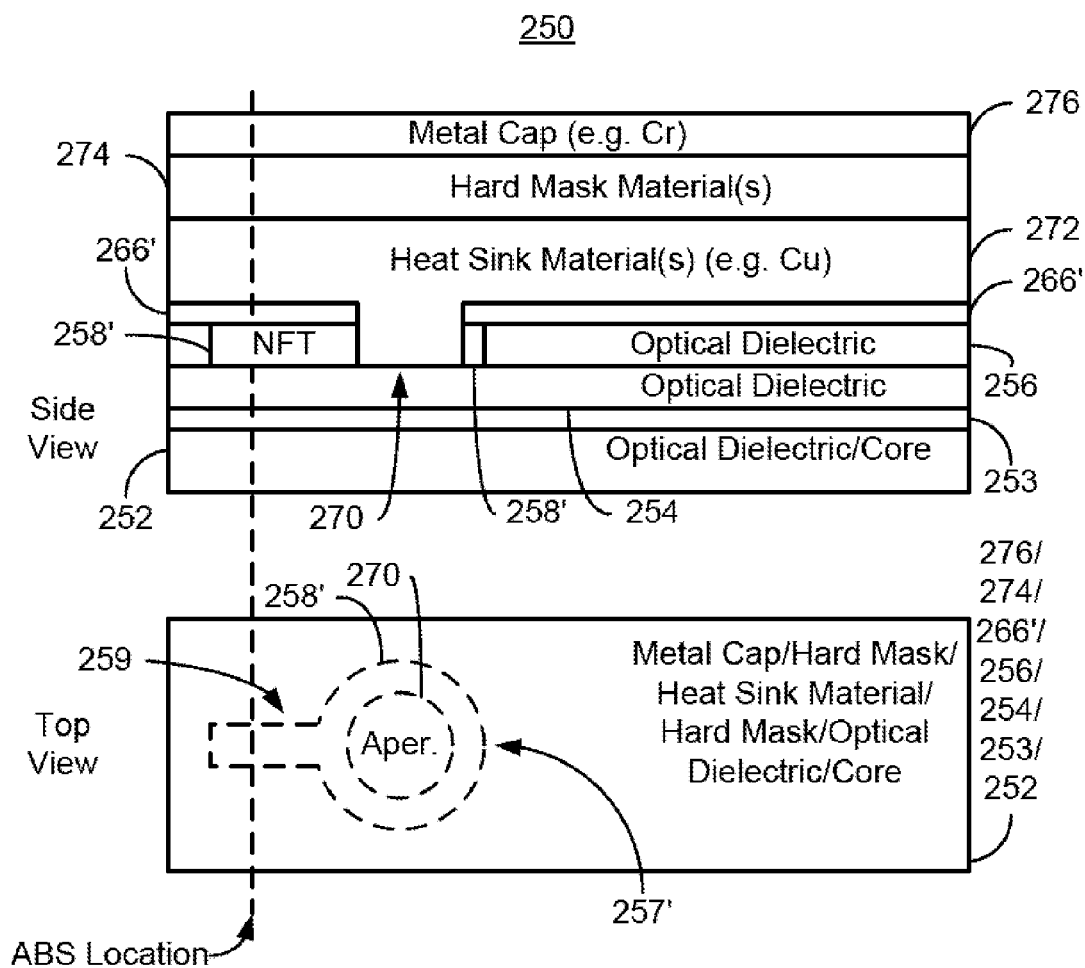

Material(s) for the heat sink are deposited, via step 216. Step 216 includes depositing high thermal conductivity materials such as Au and/or Cu. In other embodiments, other high thermal conductivity material(s), including those other than metals, may be used. For example, a high conductivity insulator might be deposited in addition to or in lieu of the Au and/or Cu. Hard mask layer(s) are also deposited, via step 218. The hard mask layers may include a SiC and/or a-C hard mask layer and a metal capping layer, such as Cr. The hard mask layer may be on the order of at least fifty nm, while the metal capping layer may be on the order of ten nanometers in thickness. However, other thicknesses may be used. FIG. 10 depicts the EAMR transducer 250 after step 218 is performed. Thus, heat sink material(s) 272, hard mask material(s) 274, and metal cap layer 276 are shown.

Figure 11:
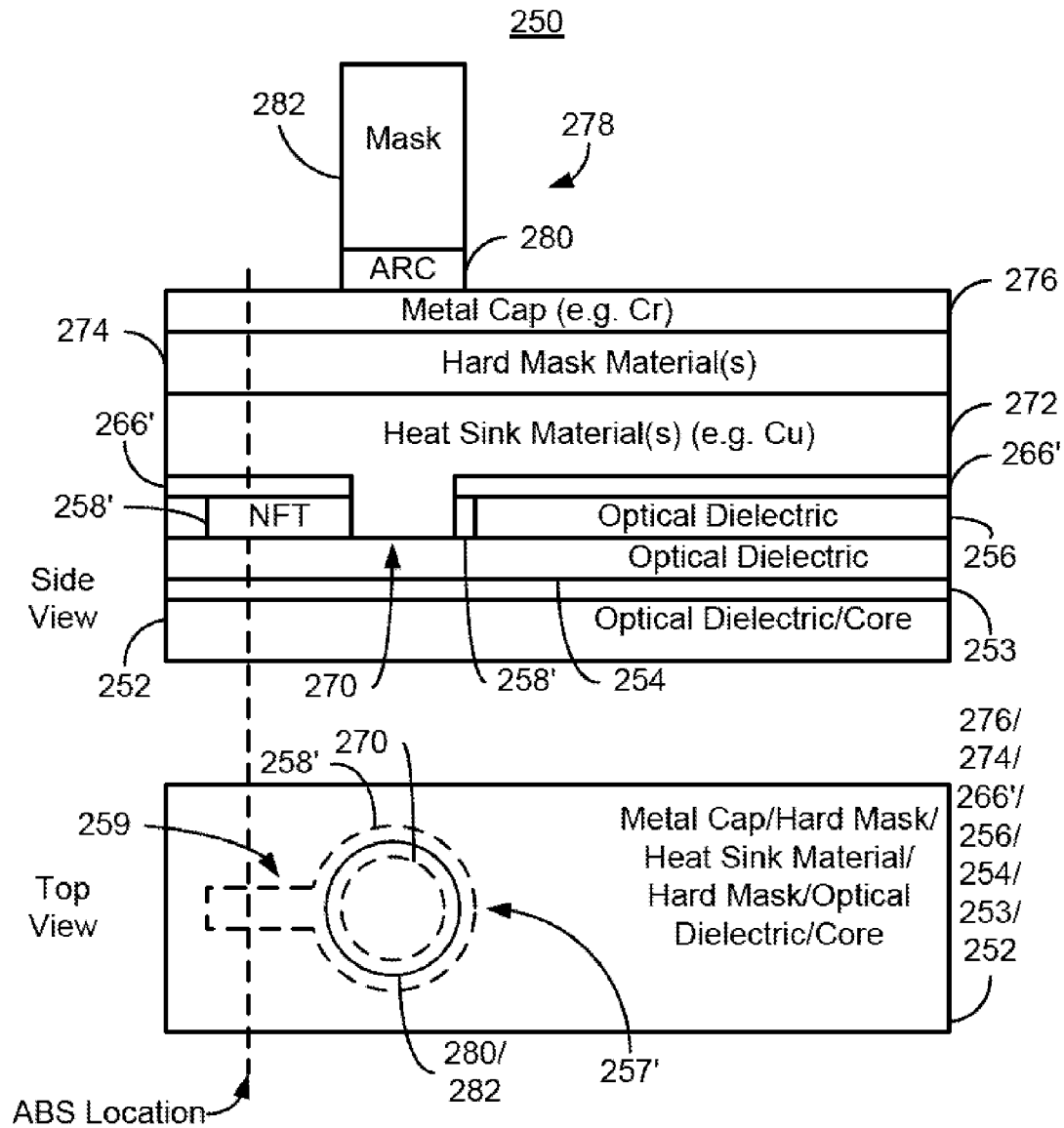

A photoresist mask is formed on the hard mask layer(s), via step 220. The photoresist mask may be a photoresist post residing on an ARC layer. Step 220 may thus include blanket depositing an ARC layer, depositing a photoresist layer, patterning the photoresist layer using photolithography, and removing the exposed ARC layer in the field, for example using an oxygen plasma. As part of step 220 alignment marks for the photoresist mask may also be opened. FIG. 11 depicts the EAMR transducer 250 after step 220 is performed. Thus, mask 278 having ARC layer 280 and photoresist post 282 are shown. In some embodiments, the diameter of the mask 280 is the same as the aperture 270. However, in other embodiments, the diameters may differ. In the embodiment shown, the mask 278 has a larger diameter than the aperture 270. Thus, when the pattern of the mask 278 is transferred to the heat sink materials 272, the portion of the heat sink materials in the aperture 270 remain.

Figure 12:
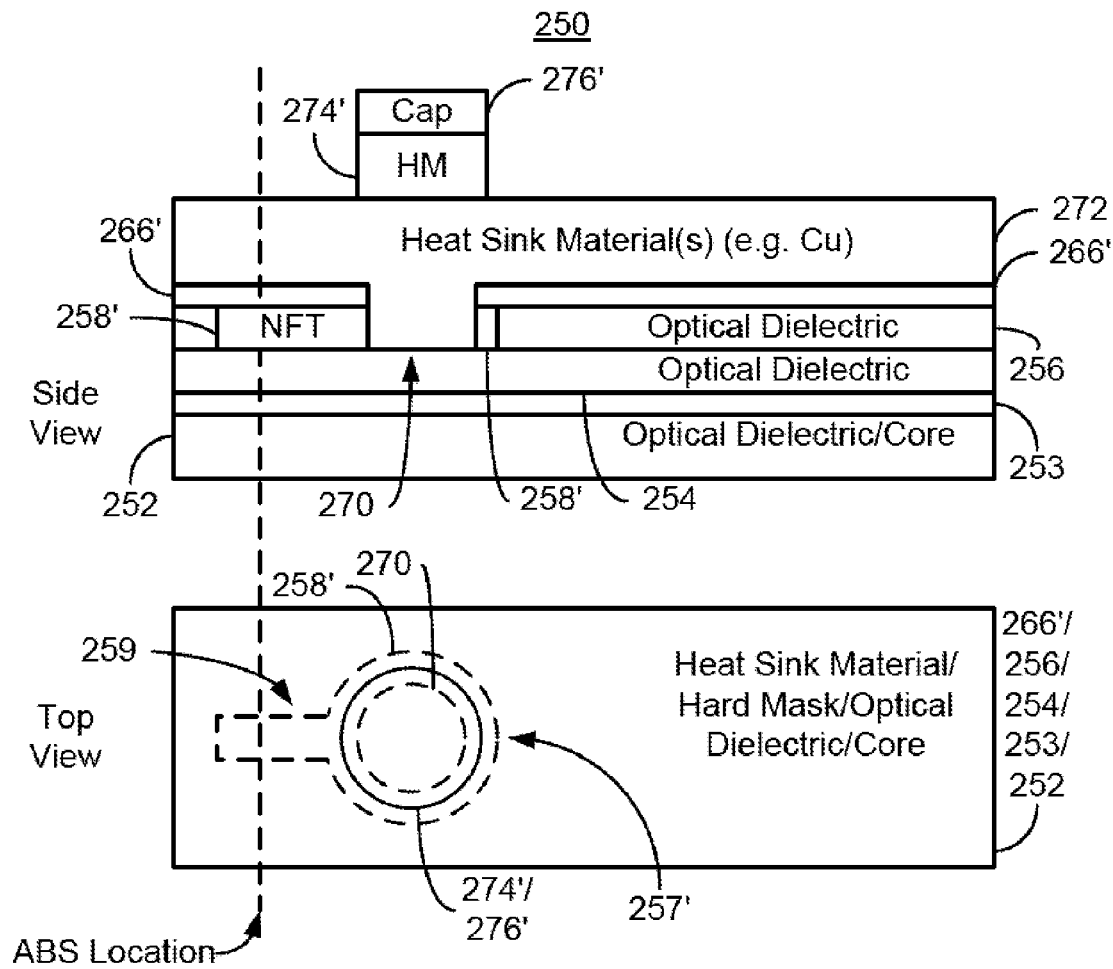

The pattern of the photoresist mask 278 is transferred to the hard mask layers 274 and 276, via step 222. The pattern of the photoresist mask may be first transferred to the metal cap layer 276, for example using ion milling. The metal cap layer 276 may then act as a hard mask for the pattern transfer to the underlying hard mask layer(s) 274. Thus, the portions of the hard mask layers 274 and 276 exposed by the mask 278 are removed. FIG. 12 depicts the EAMR transducer after step 222 is performed. Thus, the cap layer 276' and hard mask layer 274' have been formed.

Figure 13:
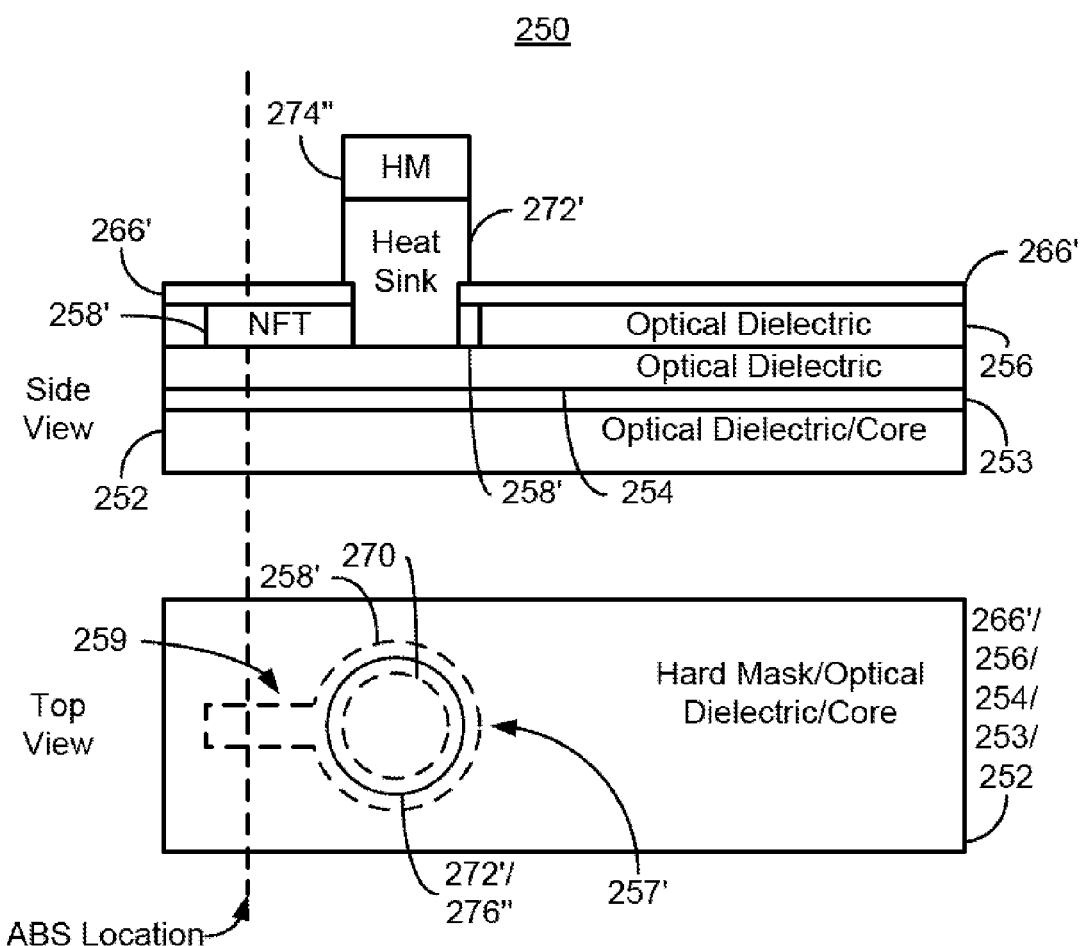

The pattern of the hard mask layers 274' and 276' is then transferred to the heat sink material(s) 272, via step 224. Stated differently, the heat sink material(s) 272 exposed by hard mask layers 274' and 276' are removed, for example via ion milling. FIG. 13 depicts the EAMR transducer 250 after step 224 is performed. Thus, heat sink 272' is shown. In some embodiments, the ion mill or other process used to remove the exposed heat sink materials stops at the hard mask layer 266'.

Figure 14:
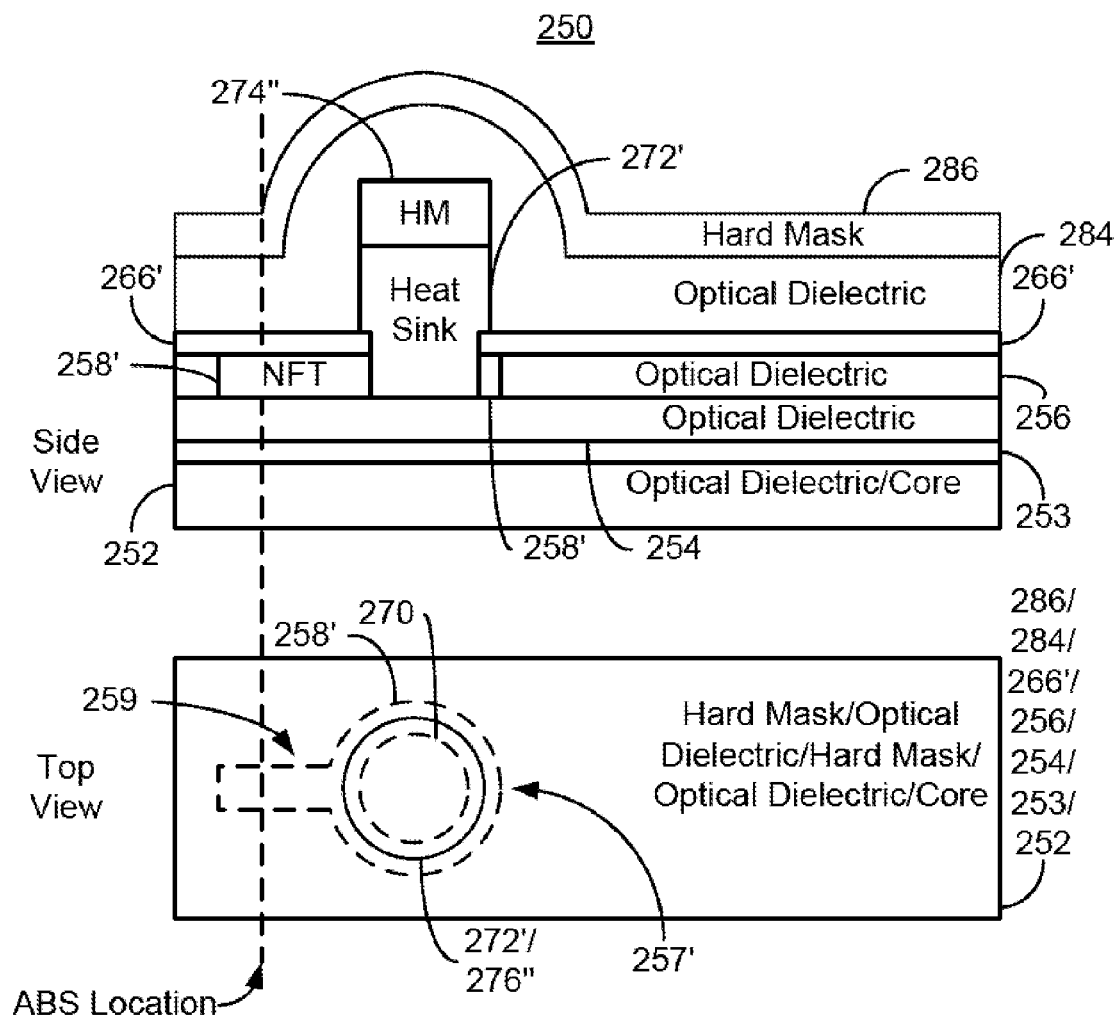

The EAMR transducer 250 is backfilled with an insulating material, via step 226. For example, an aluminum oxide layer may be deposited. In some embodiments, the layer has substantially the same thickness as the heat sink 272'. A hard mask layer is also provided, via step 228. The hard mask layer deposited in step 228 is desired to have the same thickness as the hard mask layer 274". FIG. 14 depicts the EAMR transducer after step 226 has been performed. Thus, the optical dielectric/insulator 284 and hard mask layer 286 are shown.

Figure 15:
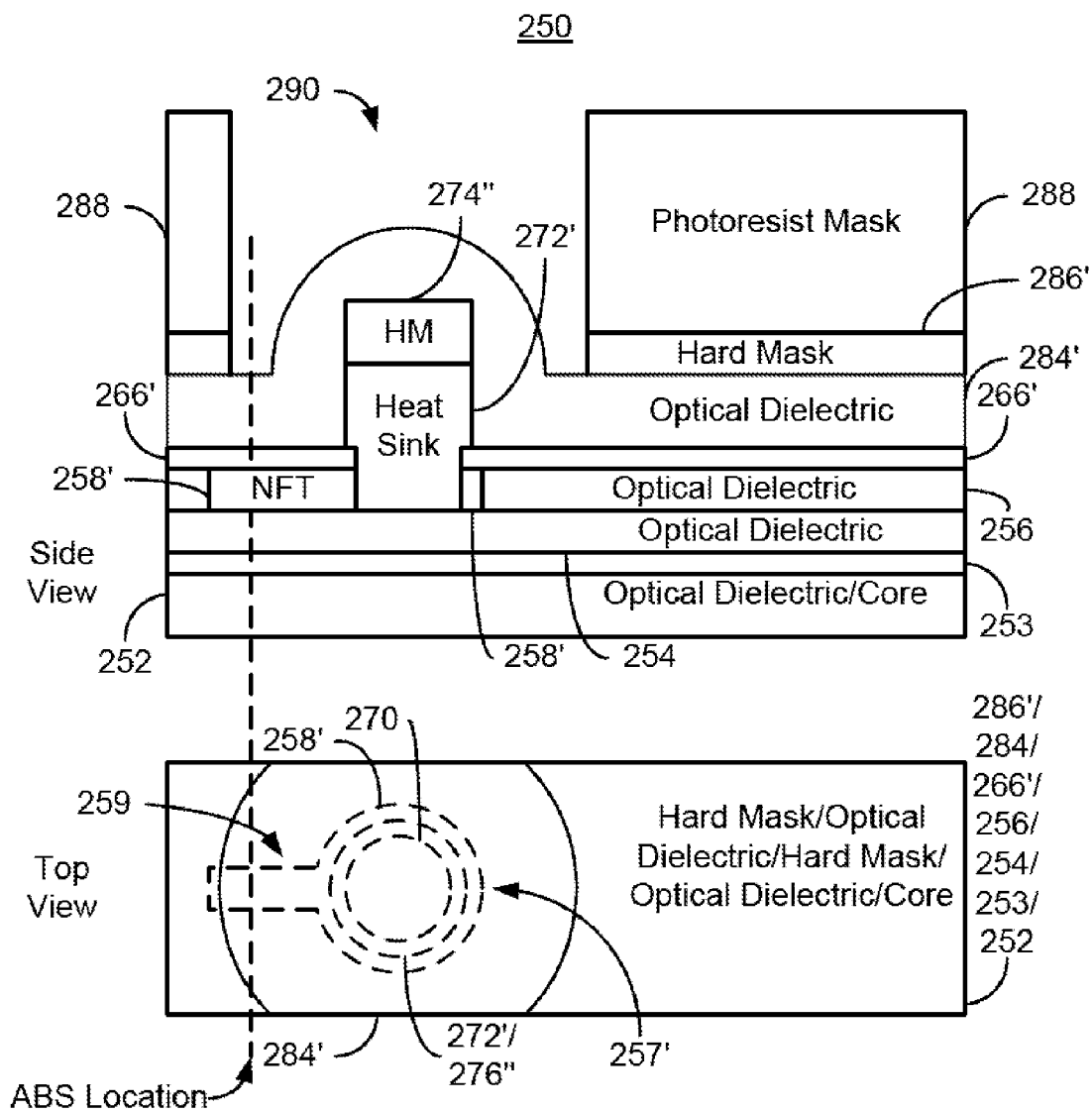

A resist mask having an aperture larger than the heat sink is provided, via step 230. In some embodiments, the aperture is on the order of five hundred nanometers in diameter or greater. The pattern of the resist mask is then transferred to the hard mask, via step 232. For example, an oxygen plasma etch may be used in step 232. Thus, steps 226-232 form a hard mask with an aperture larger than the heat sink. FIG. 15 depicts the transducer 250 after step 232 is performed. Thus, resist mask 288 is shown. An aperture 290 has been formed in the hard mask 286' and the photoresist mask 288.

Figure 16:
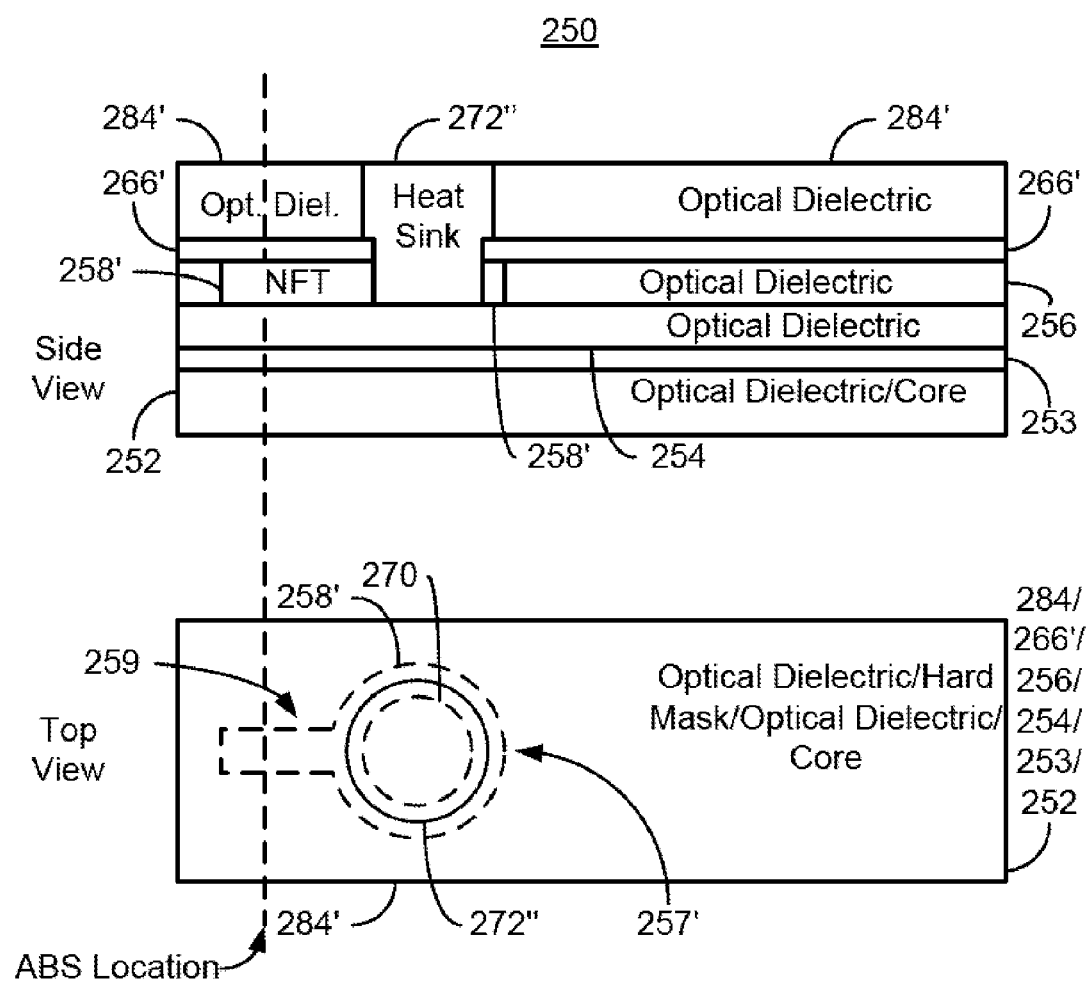

The exposed insulator 284' is removed, via step 234. Also in step 234, the photoresist mask 288 is removed. In some embodiments, step 234 includes stripping the photoresist mask 288, then performing a chemical mechanical planarization (CMP) to remove the exposed insulator 284. Thus, the heat sink 272" may be exposed. Also in step 234, the remaining hard mask 286' is removed after the CMP. FIG. 16 depicts the transducer 250 after step 234 is performed. Thus, the heat sink 272" is exposed. A portion of the optical dielectric 284' remains. Note, however, that the top surface of the heat sink 272" is parallel to the top of the NFT 258'.

A portion of the heat sink 272" may optionally be removed, via step 236. Step 236 may be performed if, for example, the top surface of the heat sink is to be sloped, as shown in FIG. 3. Step 236 may include providing a mask covering at least a portion of the optical dielectric 284' and then ion milling the EAMR transducer 250 at a milling angle. This milling angle corresponds to the angle desired for the top surface of the heat sink. For example, in some embodiments, the milling angle is at least twenty and not more than fifty degrees. In other embodiments, the desired milling angle is at least twenty and not more than forty-five degrees. In some embodiments, the taper angle for the heat sink 264 is at least twenty-seven and not more than thirty-three degrees. In other embodiments, other milling and taper angles may be used. Fabrication of the EAMR transducer 250 may then be completed. For example, waveguide(s), pole(s), and coil(s) (all not shown in FIGS. 6-16) may be formed.

Thus, using the method 200, the EAMR transducer 250 may be fabricated. The EAMR transducer has an NFT having a ring portion as well as a heat sink. A portion of the heat sink resides in the aperture of the ring. The method 200 and EAMR transducer 250 share the benefits of the NFT 100/100' and the EAMR head 150. Consequently, manufacturing, reliability, and performance of the transducer 250 may be improved.

We claim:

1. An energy assisted magnetic recording (EAMR) transducer coupled with a laser for providing energy and having an air-bearing surface (ABS) configured to reside in proximity to a media during use, the EAMR transducer comprising:
    a near field transducer (NFT) for focusing the energy onto the region of the media, the NFT having a ring portion having an aperture therein and a pin portion proximate to the ABS, the NFT being metallic, the pin portion residing between the aperture and the ABS;
    a write pole configured to write to a region of the media; and
    at least one coil for energizing the write pole.

2. An energy assisted magnetic recording (EAMR) transducer coupled with a laser for providing energy and having an air-bearing surface (ABS) configured to reside in proximity to a media during use, the EAMR transducer comprising:
    a near field transducer (NFT) for focusing the energy onto the region of the media, the NFT having a ring portion having an aperture therein and a pin portion proximate to the ABS;
    a write pole configured to write to a region of the media; and
    at least one coil for energizing the write pole
    a heat sink thermally coupled with the NFT and the write pole, a portion of the heat sink residing in the aperture.

3. The EAMR transducer of claim 2 wherein ring portion of the NFT has a circular cross-sectional shape.

4. The EAMR transducer of claim 2 wherein the aperture has an aperture diameter of at least one hundred nanometers and not more than two hundred nanometers.

5. The EAMR transducer of claim 4 wherein the aperture diameter of at least one hundred forty nanometers and not more than one hundred eighty nanometers.

6. The EAMR transducer of claim 4 wherein the ring has an outside diameter of not more than three hundred nanometers.

7. The EAMR transducer of claim 2 wherein at least the portion of the heat sink in the aperture includes an insulator.

8. The EAMR transducer of claim 2 wherein at least the portion of the heat sink in the aperture includes a metal.

9. The EAMR transducer of claim 2 wherein at least the portion of the heat sink includes at least one of Cu, aluminum nitride, and beryllium oxide.

10. The EAMR transducer of claim 2 wherein the NFT includes at least one of Au and Ag.

11. The EAMR transducer of claim 2 wherein the NFT includes a first material having a first real index of refraction (n1) and a first imaginary index of refraction (k1), wherein the portion of the heat sink includes a second material having a second real index of refraction (n2) and a second imaginary index of refraction (k2) and wherein a first product of n1 and k1 is not more than on tenth of a second product of n2 and k2.

12. An energy assisted magnetic recording (EAMR) transducer coupled with a laser for providing energy and having an air-bearing surface (ABS) configured to reside in proximity to a media during use, the EAMR transducer comprising:
   a near field transducer (NFT) for focusing the energy onto the region of the media, the NFT having a ring portion and a pin portion proximate to the ABS, the ring portion having an outside diameter of not more than three hundred nanometers and aperture therein, the aperture having an aperture diameter of at least one hundred forty nanometers and not more than one hundred eight nanometers, the NFT consisting of Au;
   a heat sink thermally coupled with the NFT, a portion of the heat sink residing in the aperture and including Cu;
   a write pole configured to write to a region of the media, the write pole being thermally coupled with the heat sink; and
   at least one coil for energizing the write pole.

13. An energy assisted magnetic recording (EAMR) disk drive comprising:
   a media
   a slider having an air-bearing surface (ABS) configured to reside in proximity to the media during use;
   a laser coupled with the slider and for providing energy;
   an EAMR head coupled with the slider and including an EAMR transducer optically coupled with the laser and including a near field transducer (NFT), a write pole, and at least one coil, the NFT for focusing the energy onto the region of the media, the NFT having a ring portion having an aperture therein and a pin portion proximate to the ABS, the NFT being metallic, the pin portion residing between the aperture and the ABS, the write pole being configured to write to a region of the media, the at least one coil for energizing the write pole.

14. An energy assisted magnetic recording (EAMR) disk drive comprising:
   a media
   a slider having an air-bearing surface (ABS) configured to reside in proximity to the media during use;
   a laser coupled with the slider and for providing energy;
   an EAMR head coupled with the slider and including an EAMR transducer optically coupled with the laser and including a near field transducer (NFT), a write pole, and at least one coil, the NFT for focusing the energy onto the region of the media, the NFT having a ring portion having an aperture therein and a pin portion proximate to the ABS, the write pole being configured to write to a region of the media, the at least one coil for energizing the write pole; and
   a heat sink thermally coupled with the NFT and the write pole, a portion of the heat sink residing in the aperture.

15. A method for providing an energy assisted magnetic recording (EAMR) transducer coupled with a laser for providing energy and having an air-bearing surface (ABS) configured to reside in proximity to a media during use, the method comprising:
   providing a near field transducer (NFT) for focusing the energy onto the region of the media, the NFT having a ring portion having an aperture therein and a pin portion proximate to the ABS, the NFT being metallic, the pin portion residing between the aperture and the ABS;
   providing a write pole configured to write to a region of the media; and
   providing at least one coil for energizing the write pole.

16. A method for providing an energy assisted magnetic recording (EAMR) transducer coupled with a laser for providing energy and having an air-bearing surface (ABS) configured to reside in proximity to a media during use, the method comprising:
   providing a near field transducer (NFT) for focusing the energy onto the region of the media, the NFT having a ring portion having an aperture therein and a pin portion proximate to the ABS;
   providing a write pole configured to write to a region of the media; and
   providing at least one coil for energizing the write pole; and
   providing a heat sink thermally coupled with the NFT and the write pole, a portion of the heat sink residing in the aperture.

17. The method of claim 16 wherein the step of providing the NFT further includes:
   providing an NFT disk;
   providing a photoresist post on the NFT disk;
   depositing a hard mask layer;
   removing the photoresist post, thereby providing a hard mask aperture in the hard mask layer;
   removing an exposed portion of the NFT disk exposed by the hard mask aperture, thereby providing the ring having the aperture therein.

18. The method of claim 17 wherein the step of providing the heat sink further includes:
   depositing a heat sink layer, a portion of the heat sink layer residing in the aperture and forming the portion of the heat sink;
   providing at least one hard mask layer on the heat sink layer;
   providing an additional photoresist post on the at least one hard mask layer, the additional photoresist post corresponding to the heat sink;
   removing an exposed portion of the at least one hard mask layer;
   removing an exposed portion of the heat sink layer;
   backfilling the EAMR transducer with an insulating layer;
   providing a hard mask having a heat sink aperture having a diameter greater than the heat sink;
   planarizing the transducer, exposing a top portion of a remaining portion of the heat sink layer.

19. The method of claim 18 wherein the step of forming the heat sink further includes:
   removing the top portion of the heat sink layer, forming an angled top surface of the heat sink.

* * * * *